United States Patent [19]

Fukui et al.

[11] Patent Number: 5,647,685
[45] Date of Patent: Jul. 15, 1997

[54] FRICTIONAL TYPE CONNECTOR FOR CONNECTING A ROTATOR TO A SHAFT

[75] Inventors: Toyoakira Fukui, Kyoto; Yoshio Kurokawa, Yawata, both of Japan

[73] Assignee: Tsubakimoto Chain Co., Osaka, Japan

[21] Appl. No.: 472,316

[22] Filed: Jun. 7, 1995

[30] Foreign Application Priority Data

Jun. 13, 1994 [JP] Japan ............................. 6-153090

[51] Int. Cl.$^6$ ........................................... F16D 1/06
[52] U.S. Cl. ........................ 403/370; 403/371; 403/374
[58] Field of Search .................................. 403/370, 371, 403/372, 374, 369, 368, 367, 373; 411/354; 288/334.4

[56] References Cited

U.S. PATENT DOCUMENTS

| | | | |
|---|---|---|---|
| 3,578,362 | 5/1971 | Cauthery | 285/334.4 X |
| 3,694,010 | 9/1972 | Callahan, Jr. | 285/334.4 |
| 3,782,841 | 1/1974 | Winckelhaus | 403/373 |
| 3,957,381 | 5/1976 | Schafer | 403/369 X |
| 3,972,636 | 8/1976 | Peter et al. | 403/374 |
| 3,990,804 | 11/1976 | Peter et al. | 403/370 |
| 4,097,167 | 6/1978 | Stratienko | 403/374 |
| 4,268,185 | 5/1981 | Mullenberg | 403/370 X |
| 4,304,502 | 12/1981 | Stratienko | 403/370 |
| 4,471,846 | 9/1984 | Mullenberg | 403/370 X |
| 4,557,621 | 12/1985 | Mullenberg | 403/370 X |
| 4,781,486 | 11/1988 | Mochizuki | 403/371 X |
| 5,123,771 | 6/1992 | Okuno | 403/369 |
| 5,145,277 | 9/1992 | Fujita et al. | |
| 5,174,680 | 12/1992 | Nakamura et al. | |

FOREIGN PATENT DOCUMENTS

| | | | |
|---|---|---|---|
| 2045377 | 10/1980 | United Kingdom | 403/409.1 |
| 2207488 | 2/1989 | United Kingdom | 403/370 |

*Primary Examiner*—Harry C. Kim
*Attorney, Agent, or Firm*—Armstrong, Westerman, Hattori, McLeland & Naughton

[57] ABSTRACT

The frictional type connector 10 includes an inner ring 20, an outer ring 30, and bolts 40. The outer surface of the inner ring 20 is formed into a tapered surface 23 which decreases the diameter from a flange portion 21 toward the other end of the inner ring. The outer ring 30 has an inner tapered surface 31, so that the tapered surface can face the outer tapered surface 23 of the inner ring 20. The taper angle $\theta i$ of the tapered surface of the inner ring 20 is larger than the taper angle $\theta o$ of the tapered surface of the outer ring 30.

4 Claims, 3 Drawing Sheets

FRICTIONAL TYPE CONNECTOR FOR CONNECTING A ROTATOR TO A SHAFT

BACKGROUND OF THE INVENTION

The present invention relates to a frictional type connector adapted for connecting a rotator, such as, a gear, a sprocket, a joint, or the like, to a shaft.

FIG. 4 shows a conventional frictional type connector 50. The connector 50 includes an inner ring 52 having an outer tapered surface, an outer ring 54 having an inner tapered surface corresponding to the outer tapered surface, and plurality of bolt 56 for effecting relative axial movement between the inner ring 52 and the outer ring 54.

A shaft 12 and a rotator 14 connected by the frictional type connector 50 are usually manufactured within the dimensional tolerance (JIS (:Japanese Industrial Standard) B0401) of h 8, H 8. The shaft 12 and the rotator 14 within the above mentioned dimensional tolerance will cause no problems. But the shaft 12 and/or the rotator 14, having a manufacturing error, may cause considerable decrease in transfer torque. As the inner ring 52 tends to be easily deformed at the thinner portion thereof, the shaft 12, having a smaller diameter than an appropriate diameter, would cause the inner ring 52 to be deformed at the thinner portion. Therefore, as shown in FIG. 4, higher pressure will be applied to the thinner portion. Such uneven pressure will cause the shaft 12 to be deformed, thus decreasing the transfer torque.

Any damage to the shaft will require the shaft 12 to be reproduced or cause accidents, due to the slips, which will be taken place between the inner ring 52 and the shaft 12.

In applying the connector to a shaft, having relatively poor accuracy, (for example; dimensional tolerance (JIS B0401) of h 10), transfer torque tends to decrease, and problems, as mentioned above, will occur.

Further, in applying a connector to machineries, which include various kinds of parts such as, a motor, a gear, a sprocket, or a joint, or the like, it will be necessary to use a connector, suitable for each parts, having such a dimensional tolerance as "m 6", "h 7" or the like. Applying the connector to the above mentioned machineries will require increased number of parts and lead to mis-assembling of the connector.

Partially increased pressure will be applied to the rotator at the thinner portion of the inner ring. However, the possibility of decreasing the transfer torque between the rotator and the outer ring is smaller than that between the shaft and the inner ring. Because contacting area, between the outer ring and the rotator, is larger than that between the inner ring and the shaft.

SUMMARY OF THE INVENTION

The present invention solved the above mentioned problems by a frictional type connector comprising an inner ring, having an outer tapered surface, an outer ring having an inner tapered surface, and bolts for effecting relative axial movement between the inner ring and the outer ring, with the outer tapered surface faced on the inner tapered surface, characterized in that: a taper angle of the outer tapered surface of the inner ring is larger than that of the inner tapered surface of the outer ring.

When the inner and outer rings are placed in a circular space, formed between a shaft and a rotator, with their tapered surfaces facing each other, and are forced to effect relative axial movement therebetween, the thinner portion of the outer ring is fitted to the thicker portion of the inner ring. Further, relative axial movement between the inner ring and the outer ring will cause their whole tapered surfaces to come into close contact with each other. As the inner ring is contracted in the inner direction of the radius, and the outer ring is expanded in the outer direction of the radius, the rotator and the shaft will be compressed and connected with each other.

Then the pressure between the tapered surfaces is larger at the thicker portion of the inner ring, but smaller at the thinner portion thereof. The pressure, between the inner ring and the shaft, however, will be averaged between the thicker portion and the thinner portion. Because the thinner portion of the inner ring will be deformed heavily, compared to the thicker portion thereof, because of the different rigidity of the thinner and thicker portions.

DETAILED DESCRIPTION OF THE PREFERRED EMBODIMENT

Preferred embodiments of the friction type connector, according to the present invention will now be described, in detail, with reference to the accompanying drawings.

The frictional type connector 10 comprises an inner ring 20, an outer ring 30 and plurality of bolts 40.

Figure 2A:
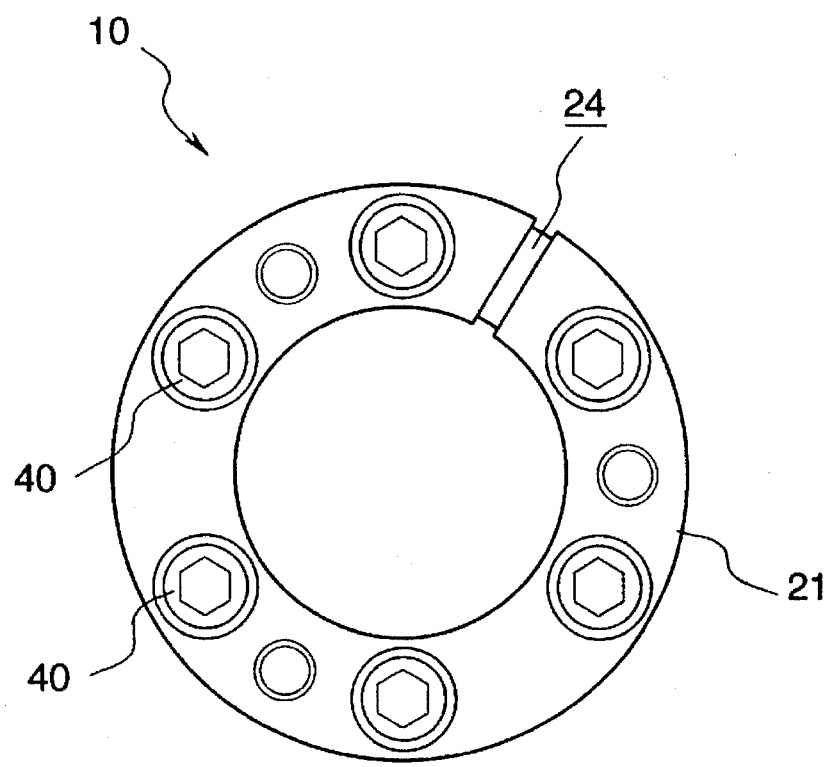
FIG. 2A shows a side view of the frictional type connector according to the present invention.
Figure 2B:
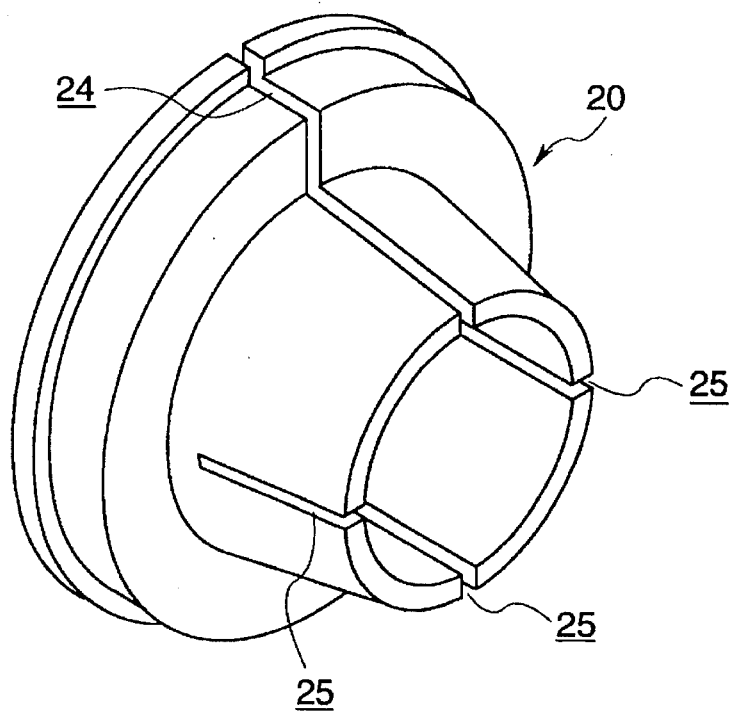
FIG. 2B shows a perspective view of the inner ring according to the present invention.

The inner ring 20 has a flange portion 21 at one end thereof. An annular protrusion 22 is formed on one end of the outer surface of the flange portion 21. A rotator 14 is fitted to the annular protrusion 22 to be positioned. The inner surface of the inner ring 20 is formed into a cylindrical surface. The outer surface of the inner ring 20 is formed into a tapered surface 23 declined in the diameter from the flange portion 21 to the other end of the inner ring As shown in FIG. 2, a slit 24 is provided in the inner ring 20 from one end to the other end thereof. As shown in FIG. 2B, a plurality of slits 25 may be provided in the inner ring 20 from the other end toward the flange portion 21 along the direction of the axis of the inner ring 20 so that the inner ring can easily be contracted.

Figure 2C:
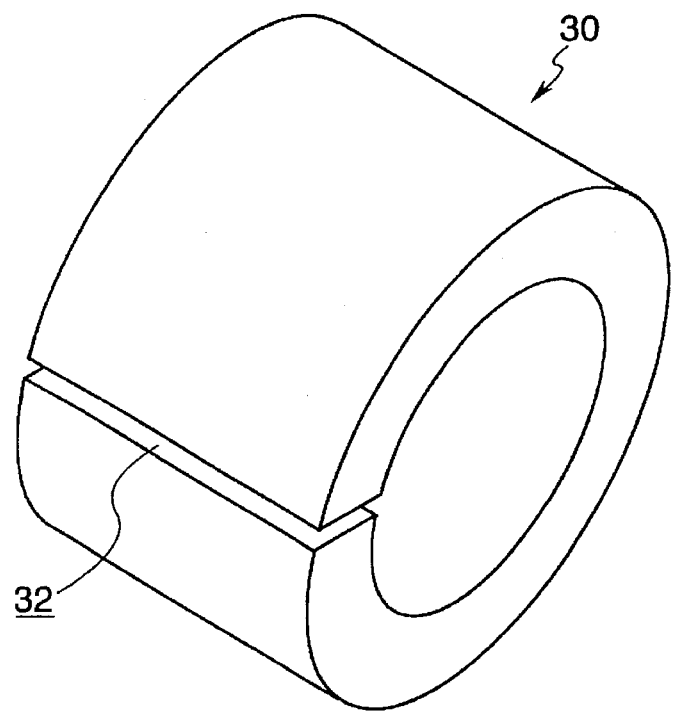
FIG. 2C shows a perspective view of the outer ring according to the present invention.
Figures 3A, 3B:
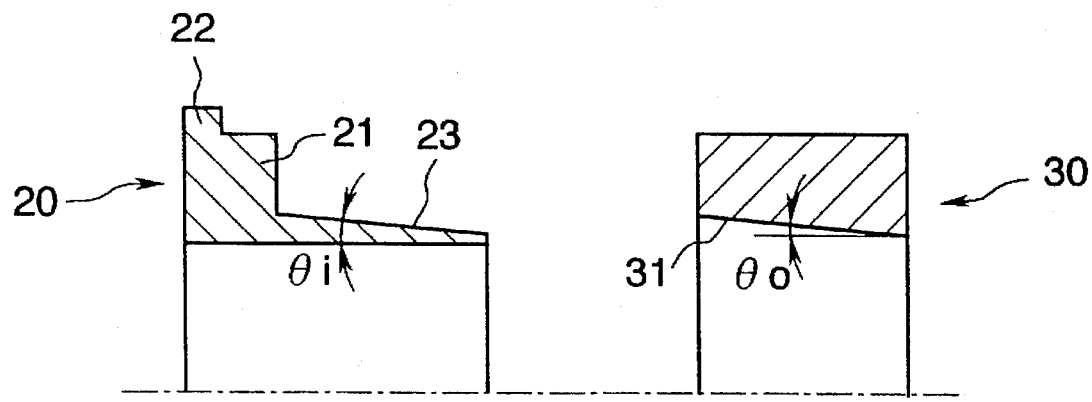
FIG. 3A shows a fragmental sectional view of the inner ring according to the present invention.
FIG. 3B shows a fragmental sectional view of the outer ring according to the present invention.
Figure 4:
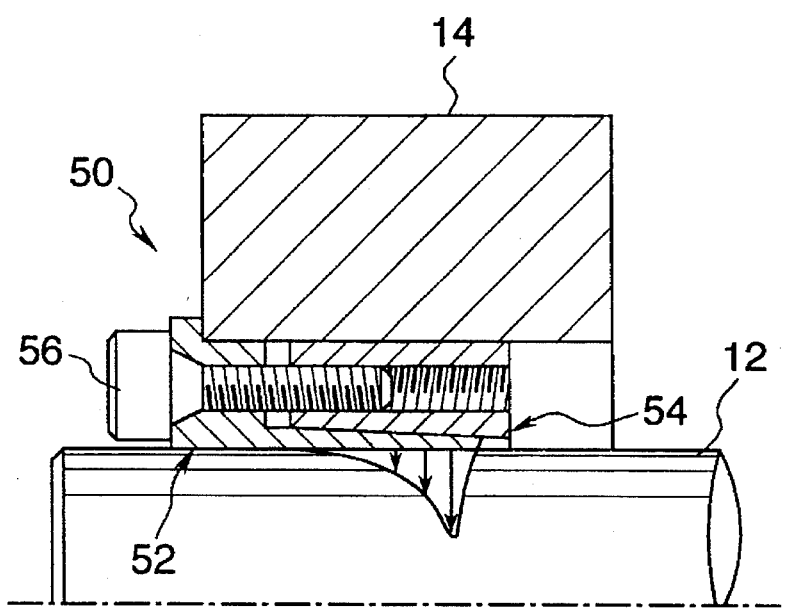
FIG. 4 shows a fragmental sectional view of the conventional frictional type connector.

The inner surface of the outer ring 30, FIG. 3B, is formed into a tapered surface 31 such that the tapered surface 31 faces the outer tapered surface 23 of the inner ring 20. An outer surface of the outer ring 30 is formed into a cylindrical surface. As shown in FIG. 2C, a slit 32 is provided in the outer ring 30 from one end to the other end thereof. The inner ring 20 and the outer ring 30 are forced to effect relative axial movement therebetween by the bolts 40 penetrating the flange portion 21.

In the connector 10 of the present invention, as shown in FIG. 3 (bolts, bolt insertion holes and threaded holes are not shown), the taper angle θi of the outer tapered surface 23 of the inner ring 20 is larger than the taper angle θo of the inner tapered surface 31 of the outer ring 30. Preferably, the taper angle θi may be larger than the taper angle θo by 5–20 minuites.

Figure 1:
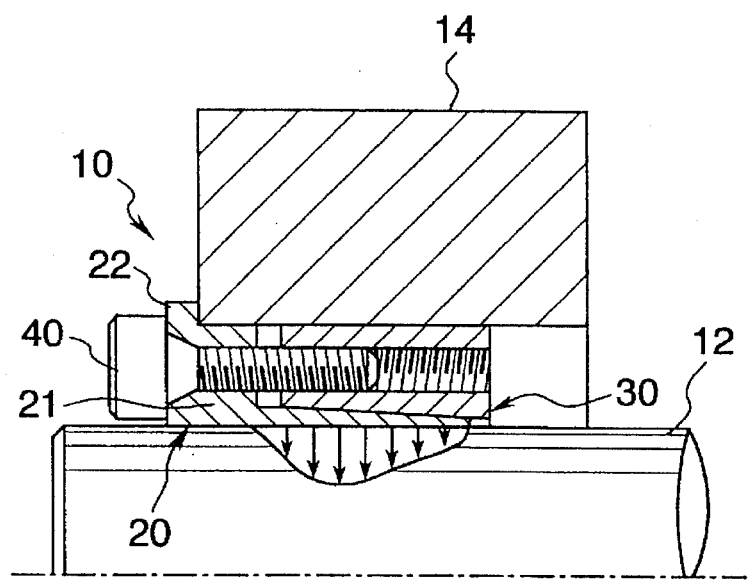
FIG. 1 shows a fragmentary sectional view of the frictional type connector according to the present invention.

When the inner ring 20 and the outer ring 30 are combined with each other, the thinner portion of the outer ring 30 contacts the thicker portion of the inner ring 20 at their tapered surfaces. When the rings are tightened by the bolts 40, the inner ring 20 contracts and the outer ring 30 expands. Thus, the tapered surfaces 23, 31 gradually become in close contact with each other. At this time, the thicker portion of the inner ring 20 receives greater pressure than the thinner portion thereof at the tapered surface. The pressure gradually becomes smaller toward the thinner portion of the inner ring 20. However, as shown in FIG. 1, the axial pressure difference between the inner surface of the inner ring 20 and the outer surface of the shaft 12 is small. Because the thicker portion of the inner ring 20 has a large strength and, therefore, is hard to deform.

As described above, setting taper angle of the outer tapered surface 23 of the inner ring 20 slightly larger than that of the inner tapered surface 31 of the outer ring 30, brings even pressure distribution at the connecting surfaces between the inner ring 20 and the shaft 12. As a result, this connector 10 can connect the rotator 14 to the shaft 12 having a dimensional error or large tolerance error, without causing any partially increased pressure, and also can be adapted for machinery which include parts having various kinds of dimensional errors.

In the present invention, the taper angle of the outer tapered surface of the inner ring is designed to be larger than that of the inner tapered surface of the outer ring. Therefore, the pressure at the outer tapered surface of the inner ring becomes smaller from the thicker portion toward the thinner portion thereof, thereby decreasing the amount of elastic deformation at the thinner portion of the inner ring. Thus, the pressure becomes equal at any part of the connecting surfaces between the inner ring and the shaft.

By using this frictional type connector for connecting a rotator to a shaft, the transfer torque therebetween can be prevented from decreasing, because partially increased pressure at the connecting surfaces between the shaft and the inner ring seldom occurs, even if the dimensional tolerance of the shaft and the rotator is relatively large, or the shaft and/or the rotator is not made within the dimensional tolerance.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A frictional type connector for connecting a rotator to a shaft, said connector comprising:

an inner ring having axial holes and an outer tapered surface extending from a thicker portion to a thinner portion of the inner ring;

an outer ring having axial tapped holes and an inner tapered surface; and bolts extending through said axial holes and threadedly engaging said axial tapped holes for effecting relative axial movement between said inner ring and said outer ring with the outer tapered surface directly contacting the inner tapered surface, wherein a taper angle of said outer tapered surface is greater than a taper angle of said inner tapered surface to reduce pressure at the outer tapered surface from said thicker portion toward said thinner portion thereof, thereby decreasing elastic deformation at the thinner portion of the inner ring.

2. A frictional type connecter as recited in claim 1, wherein the taper angle of said outer tapered surface is greater than the taper angle of said inner tapered surface by 5–20 minuites.

3. A frictional type connecter as recited in claim 1, wherein said inner ring has a flange portion at one end thereof.

4. A frictional type connecter as recited in claim 3, wherein said flange portion has an annular protrusion on one end thereof so that the rotator is adapted to be fitted to said annular protrusion.

* * * * *